United States Patent
Soma et al.

(10) Patent No.: US 10,046,556 B2
(45) Date of Patent: Aug. 14, 2018

(54) IMAGE RECORDING METHOD AND IMAGE RECORDING APPARATUS

(71) Applicant: CANON KABUSHIKI KAISHA, Tokyo (JP)

(72) Inventors: Kanako Soma, Yokohama (JP); Ryohei Goto, Fujisawa (JP); Toru Ohnishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/097,547

(22) Filed: Apr. 13, 2016

(65) Prior Publication Data

US 2016/0303847 A1    Oct. 20, 2016

(30) Foreign Application Priority Data

Apr. 20, 2015  (JP) .................. 2015-085966

(51) Int. Cl.
| | | |
|---|---|---|
| *B41J 2/005* | (2006.01) | |
| *B41J 2/01* | (2006.01) | |
| *B41M 5/00* | (2006.01) | |
| *C09D 11/10* | (2014.01) | |

(52) U.S. Cl.
CPC ........ *B41J 2/0057* (2013.01); *B41J 2002/012* (2013.01); *B41M 5/0017* (2013.01); *C09D 11/10* (2013.01)

(58) Field of Classification Search
CPC .............. B41J 2/0057; B41J 2002/012; B41M 5/0017; C09D 11/10
See application file for complete search history.

(56) References Cited

U.S. PATENT DOCUMENTS

| | | | |
|---|---|---|---|
| 4,538,156 A | 8/1985 | Durke et al. | |
| 4,920,361 A | 4/1990 | Arahara et al. | |
| 5,099,256 A | 3/1992 | Anderson | |
| 5,623,296 A * | 4/1997 | Fujino | B41J 2/0057 347/100 |
| 6,494,570 B1 * | 12/2002 | Snyder | B41J 2/0057 347/103 |

(Continued)

FOREIGN PATENT DOCUMENTS

| | | |
|---|---|---|
| JP | 62-92849 A | 4/1987 |
| JP | 4834300 B2 | 12/2011 |
| JP | 2012-051199 A | 3/2012 |

*Primary Examiner* — John P Zimmermann
(74) *Attorney, Agent, or Firm* — Fitzpatrick, Cella, Harper & Scinto (57) ABSTRACT

An image recording method includes a reaction liquid applying step; a first liquid composition applying step; an ink applying step of applying an ink containing a second water-soluble resin so as to at least partly overlap with an area where the first liquid composition is applied on an intermediate transfer member to form an intermediate image; and a step of transferring the intermediate image to a recording medium by bringing the intermediate image into contact with the recording medium to separate the intermediate image from the intermediate transfer member. The temperatures Tc, T1 of the intermediate image and intermediate transfer member from start of the contact to the separation are adjusted to be not less than the glass transition temperature Tgs of the second water-soluble resin. The temperatures Tr, T2 of the intermediate image and recording medium at the separation are adjusted to be less than Tgs.

14 Claims, 3 Drawing Sheets

(56) References Cited

U.S. PATENT DOCUMENTS

| | | | |
|---|---|---|---|
| 7,281,790 B2 | 10/2007 | Mouri et al. | |
| 7,887,177 B2 * | 2/2011 | Doi | B41J 2/0057 |
| | | | 347/103 |
| 8,038,284 B2 * | 10/2011 | Hori | B05C 1/0817 |
| | | | 347/101 |
| 8,109,626 B2 * | 2/2012 | Doi | B41J 2/0057 |
| | | | 347/103 |
| 9,102,137 B2 | 8/2015 | Koitabashi et al. | |
| 2009/0085960 A1 * | 4/2009 | Yahiro | B41J 2/2114 |
| | | | 347/21 |
| 2015/0273919 A1 | 10/2015 | Otani et al. | |
| 2016/0289479 A1 * | 10/2016 | Okuda | C09D 11/54 |

* cited by examiner

IMAGE RECORDING METHOD AND IMAGE RECORDING APPARATUS

BACKGROUND OF THE INVENTION

Field of the Invention

The present invention relates to an image recording method and an image recording apparatus.

Description of the Related Art

Ink jet recording apparatus have been widely applied to output apparatuses for computers and the like from the viewpoint that the running cost is low and the apparatus can be downsized and is easily applied to color image recording using a plurality of color inks. In recent years, there is a demand for image recording apparatus capable of outputting high quality images at high speeds regardless of the types of recording media. On the surface of a recording medium having low permeability, an ink is likely to be left and thus causes bronzing due to the material properties of the ink surface. In order to suppress the bronzing, Japanese Patent Application Laid-Open No. 2012-51199 discloses a technique of applying a treatment liquid so as not to expose the ink surface, for example.

Meanwhile, in order to achieve high quality image output at high speed, it is required to suppress image deterioration phenomena such as feathering in which inks spread along fibers of a recording medium. As one of the techniques for solving the problem, transfer type image recording apparatus including an intermediate transfer member have been developed in place of a direct drawing system in which an ink is applied directly onto a recording medium (U.S. Pat. No. 4,538,156, U.S. Pat. No. 5,099,256, Japanese Patent Application Laid-Open No. S62-92849). In the transfer type image recording apparatus, an intermediate image is formed on an intermediate transfer member by an ink jet recording apparatus. Next, the intermediate image on the intermediate transfer member is dried, and the intermediate image is transferred onto a recording medium to form a final image. By the transfer type image recording method, the intermediate image is dried on the intermediate transfer member, and thus feathering is unlikely caused even when a high quality image is output at a high speed.

However, the transfer type image recording method cannot form good images in some cases because a part of an intermediate image is not transferred, or an intermediate image is separated in the inside and only the separated part is transferred onto a recording medium, for example. As the techniques for solving the problem, a method of applying a material containing a water-soluble resin to an intermediate image formed in advance has been developed (Japanese Patent No. 4834300). In the method disclosed in Japanese Patent No. 4834300, a first material for aggregating the pigment in an ink is first applied to an intermediate transfer member, and then an ink is applied by a recording head to the intermediate transfer member to which the first material has been applied, forming an intermediate image on the intermediate transfer member. Next, a second material containing a water-soluble resin is applied to the intermediate transfer member, and then the intermediate image formed on the intermediate transfer member is transferred to a recording medium. The first material is a liquid containing at least a metal salt.

SUMMARY OF THE INVENTION

The present invention provides an image recording method including a reaction liquid applying step of applying a reaction liquid to an intermediate transfer member, a first liquid composition applying step of applying to the intermediate transfer member a first liquid composition that contains a first water-soluble resin and causes viscosity increase on contact with the reaction liquid so as to at least partly overlap with an area where the reaction liquid is applied, an ink applying step of applying an ink that contains a second water-soluble resin to the intermediate transfer member so as to at least partly overlap with an area where the first liquid composition is applied to form an intermediate image, and a transfer step of transferring the intermediate image to the recording medium by bringing the intermediate image on the intermediate transfer member into contact with a recording medium to separate the intermediate image from the intermediate transfer member while keeping the contact with the recording medium. In the image recording method, the temperature Tc of the intermediate image and the temperature T1 of the intermediate transfer member from a position at which the intermediate image starts to be in contact with the recording medium to a position at which the intermediate image is separated from the intermediate transfer member are adjusted to a temperature not less than the glass transition temperature Tgs of the second water-soluble resin, and the temperature Tr of the intermediate image and the temperature T2 of the recording medium at a position at which the intermediate image is separated from the intermediate transfer member are adjusted to a temperature less than the glass transition temperature Tgs of the second water-soluble resin.

The present invention also provides an image recording apparatus including an intermediate transfer member, a reaction liquid applying unit of applying a reaction liquid to the intermediate transfer member, a first liquid composition applying unit of applying to the intermediate transfer member a first liquid composition that contains a first water-soluble resin and causes viscosity increase on contact with the reaction liquid so as to at least partly overlap with an area where the reaction liquid is applied, an ink applying unit of applying an ink that contains a second water-soluble resin to the intermediate transfer member so as to at least partly overlap with an area where the first liquid composition is applied to form an intermediate image, a transfer unit of transferring the intermediate image to a recording medium by bringing the intermediate image on the intermediate transfer member into contact with the recording medium to separate the intermediate image from the intermediate transfer member while keeping the contact with the recording medium is maintained, and, and a temperature adjusting unit of adjusting a temperature T1 of the intermediate transfer member to a temperature not less than the glass transition temperature Tgs of the second water-soluble resin from a position at which the intermediate image starts to be in contact with the recording medium to a position at which the intermediate image is separated from the intermediate transfer member and adjusting the temperature T2 of the recording medium to a temperature less than the glass transition temperature Tgs of the second water-soluble resin at a position at which the intermediate image is separated from the intermediate transfer member.

According to the present invention, an image recording method and an image recording apparatus that can suppress bronzing, improve the efficiency of transferring an intermediate image to a recording medium, and can give an excellent image can be provided.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In the transfer system, inks are more likely to be left on the surface of a recording medium than in the direct drawing system, and thus bronzing occurs more frequently. In Japanese Patent Application Laid-Open No. 2012-51199, U.S. Pat. No. 4,538,156, U.S. Pat. No. 5,099,256, and Japanese Patent Application Laid-Open No. S62-92849, a second material containing a water-soluble resin is used to improve the transferability of an intermediate image onto a recording medium and to improve the abrasion resistance of a formed intermediate image. Meanwhile, it is desired to further improve the transferability of an intermediate image to a recording medium in terms of the relation between materials for forming an intermediate image and the temperature at the time of a transfer step. In view of the above circumstances, an object of the present invention is to provide an image recording method and an image recording apparatus that intend to suppress bronzing, improve the efficiency of transferring an intermediate image to a recording medium, and can give an excellent image.

Embodiments of the present invention will now be described. In the present invention, main terminologies and symbols are defined as follows.

The term "intermediate image" means an image formed on an intermediate transfer member with a reaction liquid, a first liquid composition, an ink, and a second liquid composition or an image formed on an intermediate transfer member with a reaction liquid, a first liquid composition, and an ink.

The term "temperature T1 of an intermediate transfer member" means the temperature of an intermediate transfer member during transfer of an intermediate image (from a position at which an intermediate image starts to be in contact with a recording medium to a position at which the intermediate image is separated from the intermediate transfer member).

The term "temperature Tc of an intermediate image" means the temperature of an intermediate image during transfer of the intermediate image (from a position at which the intermediate image starts to be in contact with a recording medium to a position at which the intermediate image is separated from an intermediate transfer member).

The term "temperature T2 of a recording medium" means the temperature of a recording medium at the completion of transfer of an intermediate image (at a position at which an intermediate image is separated from an intermediate transfer member).

The term "temperature Tr of an intermediate image" means the temperature of an intermediate image at the completion of transfer of the intermediate image (at a position at which the intermediate image is separated from an intermediate transfer member).

1. Image Recording Apparatus

First Embodiment

An image recording apparatus of the present embodiment includes an intermediate transfer member, a reaction liquid applying unit, a first liquid composition applying unit, an ink applying unit, a second liquid composition applying unit, a temperature adjusting unit, and a transfer unit. The reaction liquid applying unit enables the application of a reaction liquid onto the intermediate transfer member. The first liquid composition applying unit enables the application of a first liquid composition containing a first water-soluble resin in such a way as to at least partly overlap with an area where the reaction liquid is applied onto the intermediate transfer member, thereby causing viscosity increase when the first liquid composition comes in contact with the reaction liquid. The ink applying unit enables the application of an ink in such a way as to at least partly overlap with an area where the first liquid composition is applied onto the intermediate transfer member. The second liquid composition applying unit enables the application of a second liquid composition containing a second water-soluble resin in such a way as to at least partly overlap with an area where the ink is applied onto the intermediate transfer member, thereby forming an intermediate image. The transfer unit enables the transfer of the intermediate image to a recording medium. In addition, the temperature adjusting unit enables the adjustment of the temperatures of the intermediate transfer member and the recording medium to the following temperatures (1) and (2).

(1) The temperature T1 of the intermediate transfer member from a position at which the intermediate image starts to be in contact with the recording medium to a position at which the intermediate image is separated from the intermediate transfer member is adjusted to a temperature not less than the glass transition temperature Tgs of the second water-soluble resin.

(2) The temperature T2 of the recording medium at a position at which the intermediate image is separated from the intermediate transfer member is adjusted to a temperature less than the glass transition temperature Tgs of the second water-soluble resin.

The temperature adjusting unit may be any unit capable of adjusting the temperatures of the intermediate transfer member, the recording medium, and/or the transfer unit so as to satisfy "T1≥Tgs>T2". Depending on the glass transition temperature Tgs of a water-soluble resin, heating of the intermediate image from the intermediate transfer member side and/or the recording medium side and cooling of the intermediate image from the intermediate transfer member side and/or the recording medium side can be appropriately combined to adjust the temperature of the intermediate image, for example.

The image recording apparatus of this embodiment enables the adjustment of the temperature Tc of the intermediate image to a temperature not less than Tgs from a position at which the intermediate image starts to be in contact with the recording medium to a position at which the intermediate image is separated from the intermediate transfer member. Accordingly, the intermediate image obtains higher flowability and lower adhesion to the intermediate transfer member, and is easily separated from the intermediate transfer member. The image recording apparatus of the embodiment further enables the adjustment of the temperature Tr of the intermediate image to a temperature less than Tgs at a position at which the intermediate image is separated from the intermediate transfer member. Accordingly, after the intermediate image comes in contact with a recording medium, the temperature of the intermediate image drops rapidly, and the water-soluble resin becomes in a glassy state. Thus, the adhesion between the final image and the recording medium is improved, and the interfacial separation is unlikely to be caused. As a result, the efficiency of transferring an intermediate image to a recording medium is improved, and an excellent image can be obtained.

Figure 1:
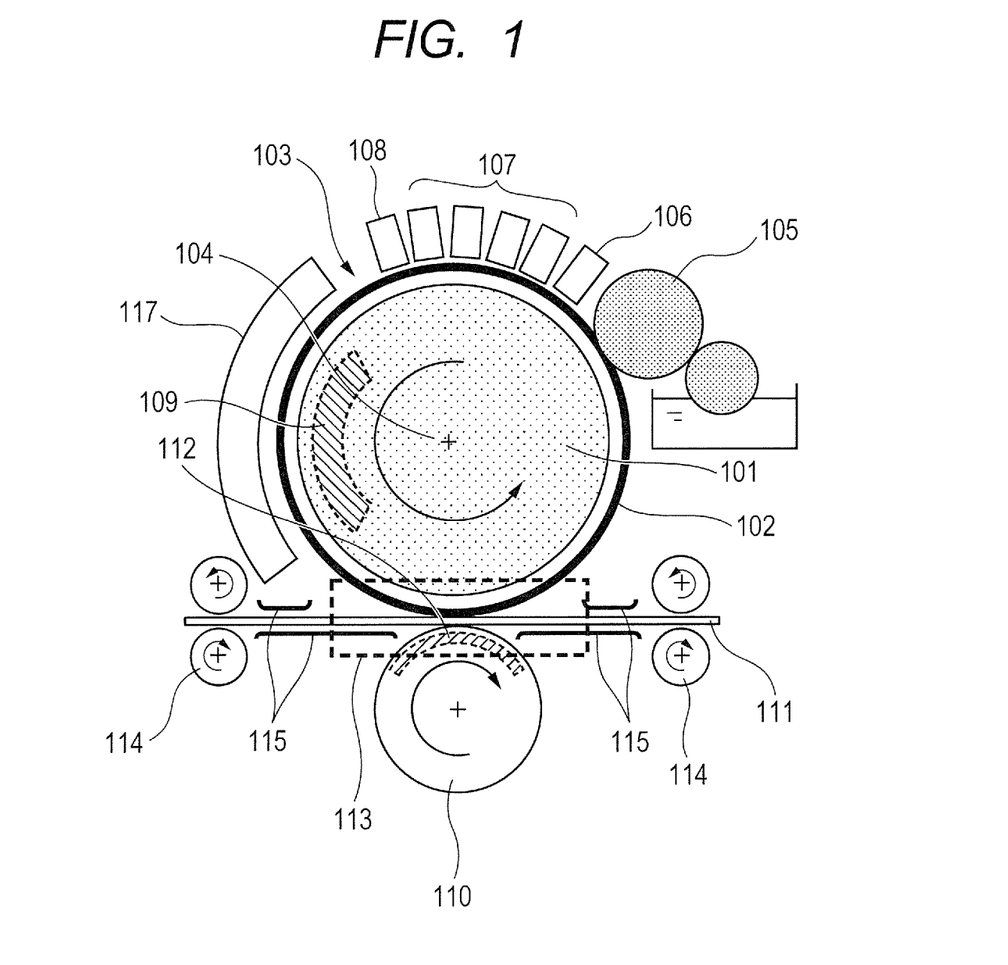
FIG. 1 is a schematic view illustrating an embodiment of an image recording apparatus.

FIG. 1 is a schematic view illustrating an embodiment of the image recording apparatus. The image recording apparatus in FIG. 1 includes an intermediate transfer member 103 including a rotatable drum-shaped support member 101 and a surface layer member 102 provided on the outer peripheral surface of the support member. The support member is rotationally driven in the arrow direction around an axis 104 as the center. Each unit arranged around the intermediate transfer member works in such a way as to be synchronized with the rotation of the support member.

As the reaction liquid applying unit of applying a reaction liquid to the outer peripheral surface of the intermediate transfer member 103, a roller type coating apparatus 105 is provided. In the roller type coating apparatus, two rollers are rotated to carry a reaction liquid, which is contained in a container for a reaction liquid, on the outer peripheral surface of each roller. Then, by the rotation of the roller in contact with the outer peripheral surface of the intermediate transfer member, the reaction liquid is applied from the roller to the outer peripheral surface of the intermediate transfer member.

At the downstream side in the rotation direction of the intermediate transfer member 103, an ink jet device 106 as the first liquid composition applying unit, ink jet devices 107 as the ink applying unit, and an ink jet device 108 as the second liquid composition applying unit are arranged in such a way as to face the outer peripheral surface of the intermediate transfer member. From the ink jet device 106, a first liquid composition is applied onto the outer peripheral surface of the intermediate transfer member 103; from the ink jet devices 107, inks are applied onto the outer peripheral surface of the intermediate transfer member 103; and from the ink jet device 108, a second liquid composition is applied onto the outer peripheral surface of the intermediate transfer member 103. As the ink jet devices 106, 107, and 108, such a device as to eject an ink on demand using an electrothermal conversion element is used. Each ink jet device includes a line-head type ink jet head arranged in a linear manner substantially parallel with the axis 104 of the intermediate transfer member 103. Hence, onto the outer peripheral surface of the intermediate transfer member, a reaction liquid, a first liquid composition, inks, and a second liquid composition are sequentially applied, thereby forming an intermediate image (mirror-inverted image) formed of these liquids.

In the image recording apparatus in FIG. 1, a blower 117 is further provided in order to reduce the liquid content in the intermediate image on the intermediate transfer member 103. This reduces the liquid content in the intermediate image, suppresses image deterioration at the time of transfer, and can give a good image. The blower is not an essential unit and is used as necessary.

The image recording apparatus includes "first temperature adjusting unit" for increasing the temperature T1 of the intermediate transfer member to a temperature not less than Tgs and "second temperature adjusting unit" for adjusting the temperature T2 of a recording medium to a temperature less than Tgs as "temperature adjusting unit". As "first temperature adjusting unit", a heater 109 is provided in the support member 101 of the intermediate transfer member 103. With the heater, the temperature of the intermediate transfer member can be controlled to increase the temperature Tc of the intermediate image from a position at which the intermediate image starts to be in contact with the recording medium to a position at which the intermediate image is separated from the intermediate transfer member to a temperature not less than Tgs.

At the further downstream side in the rotation direction of the intermediate transfer member 103, a pressure roller 110 having an outer peripheral surface facing the outer peripheral surface of the intermediate transfer member is provided, and the intermediate transfer member and the pressure roller constitute a transfer unit. With this pressure roller, the intermediate image on the intermediate transfer member can be brought into contact with a recording medium 111 and be transferred to the recording medium. As "second temperature adjusting unit", a cooler 112 is provided in the pressure roller 110. With this cooler, the temperature Tr of the intermediate image at a position at which the intermediate image is separated from the intermediate transfer member can be reduced to a temperature less than Tgs.

In this manner, the intermediate image on the intermediate transfer member and the recording medium are interposed between the intermediate transfer member and the pressure roller and are pressed, and thus the apparatus in FIG. 1 achieves efficient image transfer. In other words, an intermediate image formed on the intermediate transfer member comes in contact with a recording medium 111 which is conveyed by the rotation of conveyor rollers 114 along conveyor guides 115 in an image transfer unit 113 in an actual transfer step. The intermediate image is then separated from the intermediate transfer member and is transferred onto the recording medium.

In the apparatus of the present embodiment, the intermediate image in contact with the recording medium is separated from the intermediate transfer member while the contact is maintained. At the time, the temperature of the intermediate image is adjusted by cooling with the cooler 112. However, the temperature adjustment of an intermediate image at the time of separation is not limited to this method, and the temperature may be adjusted by cooling based on heat radiation from the intermediate image in the transfer unit.

In this case, it is preferable to select the type of the recording medium, the structure of the transfer unit, and the constituent materials in such a manner that the intermediate image has a temperature history of "Tc≥Tgs>Tr" from a point of time at which the intermediate image adjusted to have a temperature Tc is supplied to the transfer unit to a point of time at which the intermediate image is separated from the intermediate transfer member. When an intermediate image is cooled by heat radiation and a recording medium is supplied at room temperature (for example, 25° C.) to the transfer unit, the temperature of the intermediate image is reduced mainly due to the heat absorption by the recording medium, and the temperature adjustment to the temperature Tr is performed. In other words, the temperature adjusting unit in this case is only "first temperature adjusting unit" which heats the intermediate transfer member, and any structure achieving the condition "Tc≥Tgs>Tr" can be used. In some cases, the intermediate transfer member is heated with a heater; accordingly the intermediate image on the intermediate transfer member is heated, and the liquid content in the intermediate image is removed. In the above case, the apparatus shown in FIG. 1 thus achieves the intended temperature Tc by using the heater to increase the surface temperature of the intermediate transfer member on which the intermediate image is formed. In addition, the temperature of the recording medium supplied to the pressure roller is set at room temperature (25° C.), and thus the intermediate image achieves the temperature Tr due to the heat radiation to the recording medium by the contact of the intermediate image and the recording medium even though the contact area (the area of a region defined by a nip width) is small.

The recording medium may be any printing paper and can be exemplified by coated papers and matte papers. The recording medium may be a sheet cut into a predetermined shape, a long sheet, or a rolled sheet.

In the apparatus in FIG. 1, the temperature T1 of the intermediate transfer member in the image transfer unit 113 is a temperature not less than the glass transition temperature Tgs of the water-soluble resin in the intermediate image. Meanwhile, the temperature T2 of the recording medium is a temperature less than Tgs. As a result, at the time of transfer of the intermediate image in the image transfer unit, the adhesion force between the intermediate image and the recording medium is larger than the adhesion force between the intermediate image and the intermediate transfer member, and the intermediate image is efficiently transferred to the recording medium.

Figure 2:
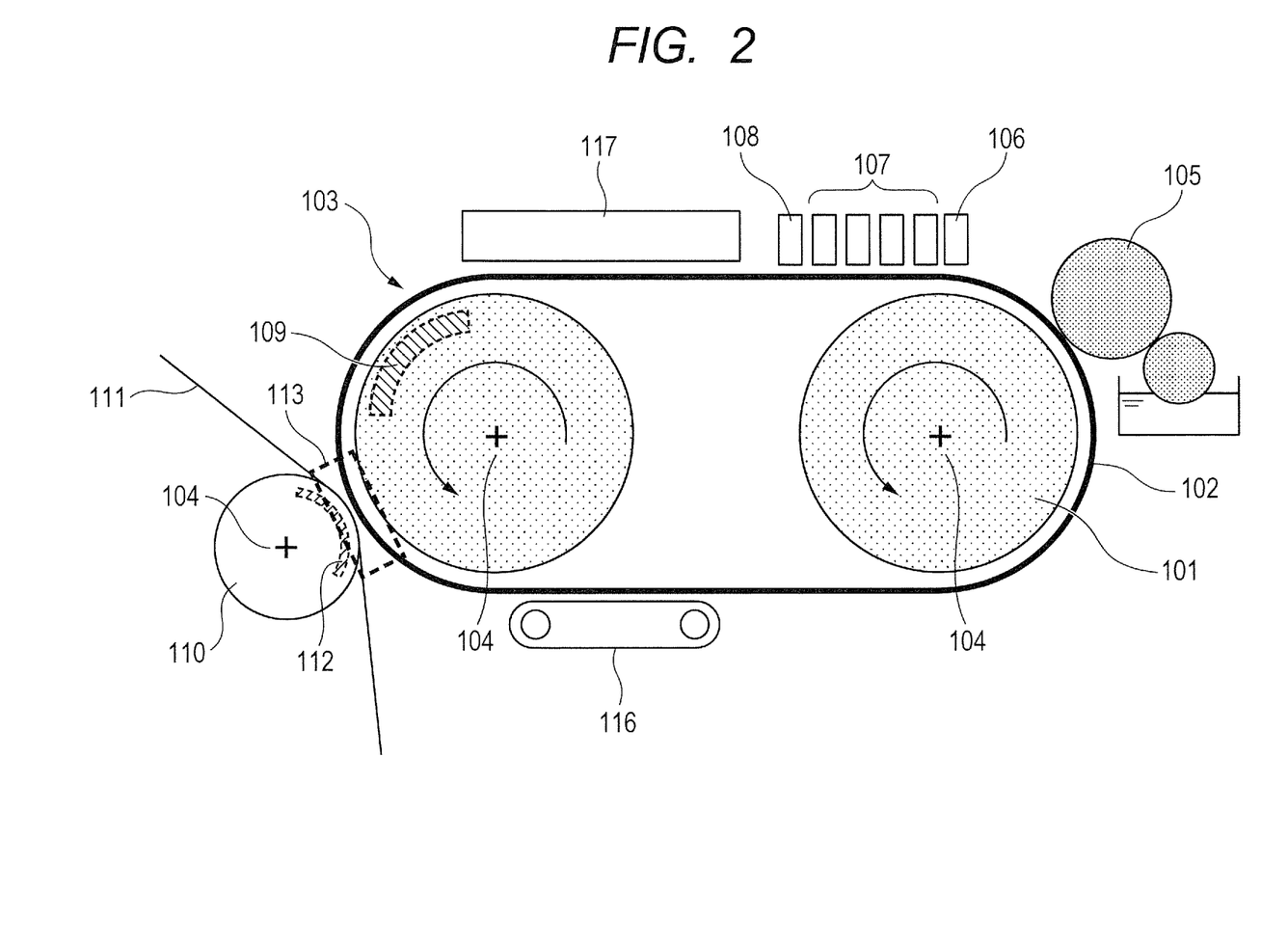
FIG. 2 is a schematic view illustrating another embodiment of the image recording apparatus.
Figure 3:
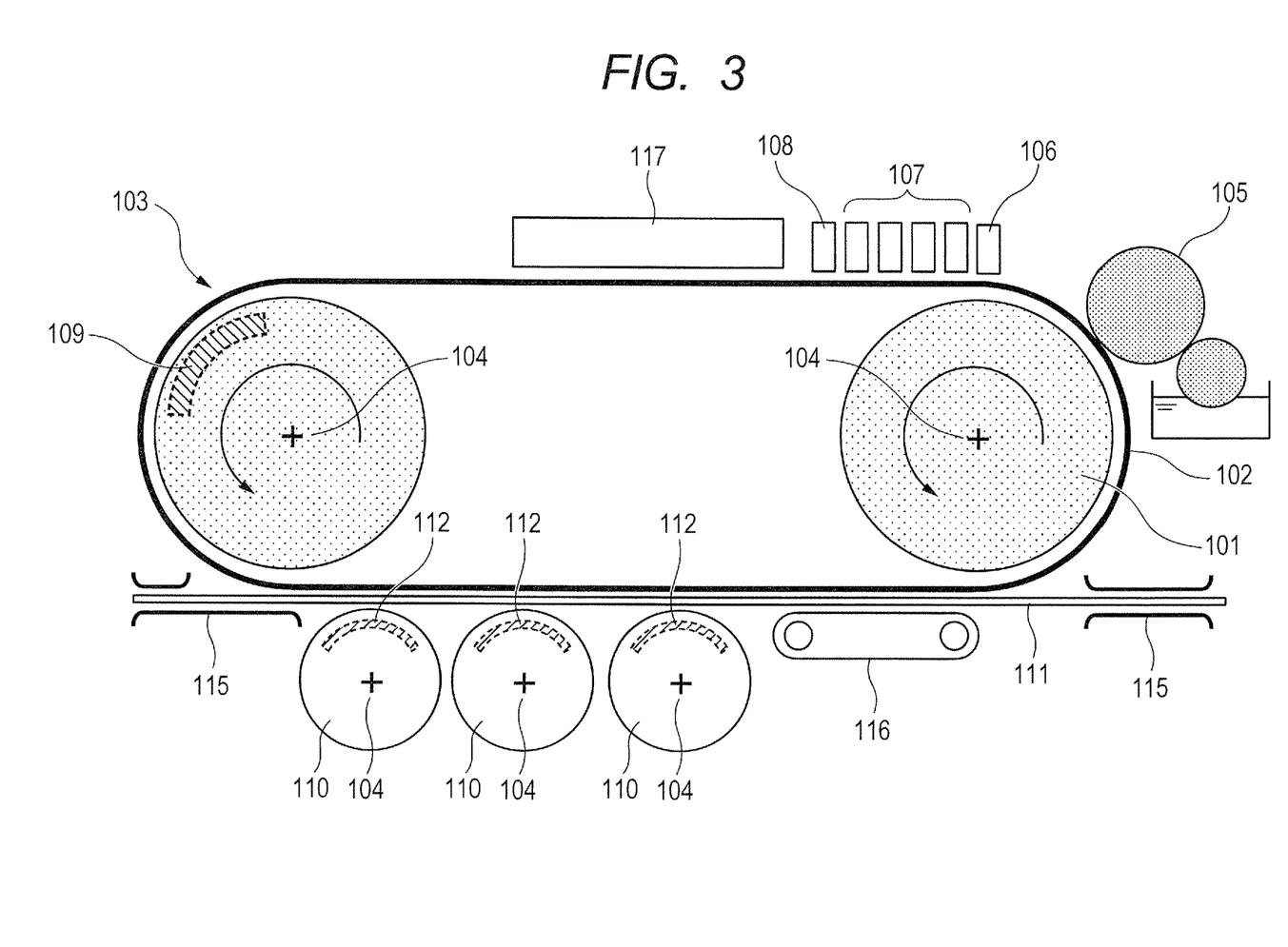
FIG. 3 is a schematic view illustrating another embodiment of the image recording apparatus.

FIG. 2 is a view illustrating another embodiment of the image recording apparatus, which differs from the image recording apparatus in FIG. 1 in that a belt-shaped intermediate transfer member 103 and a conveyor belt 116 are provided. FIG. 3 is a view illustrating another embodiment of the image recording apparatus. The image recording apparatus in FIG. 3 differs from the image recording apparatus in FIG. 1 in that a belt-shaped intermediate transfer member 103 and a conveyor belt 116 are provided and further that a plurality of pressure rollers 110 are provided. The conveyor belt 116 also functions as a fixing belt for fixing an image transferred onto a recording medium. The image recording apparatus in FIG. 2 and FIG. 3 have the same structure as that of the recording apparatus in FIG. 1 except the above changed components, and thus the explanation is omitted.

The temperature Tc and the temperature Tr of the intermediate image are not limited to particular values as long as the relation "Tc≥Tgs>Tr" is satisfied. The temperature Tc is preferably 50° C. or more and 140° C. or less, and the temperature Tr is preferably 25° C. or more and 70° C. or less.

Second Embodiment

An image recording apparatus of the second embodiment differs from the image recording apparatus of the first embodiment in that an ink that contains a second water-soluble resin is used as the ink in the ink applying unit and that the second liquid composition applying unit is not used. In other words, in the image recording apparatus of the second embodiment, the intermediate image is formed on the intermediate transfer member with the reaction liquid, the first liquid composition, and the ink. By eliminating the second liquid composition applying unit, the recording apparatus is intended to be simplified.

Intermediate Transfer Member

In the image recording apparatus of the first embodiment, the intermediate transfer member is a base material which holds the reaction liquid, the first liquid composition, the ink, and the second liquid composition to form an intermediate image. In the image recording apparatus of the second embodiment, the intermediate transfer member is a base material which holds the reaction liquid, the first liquid composition, and the ink to form an intermediate image. The intermediate transfer member includes a support member for handling the intermediate transfer member and for conveying a required force and a surface layer member provided on the support member for forming an intermediate image. The support member and the surface layer member may be formed from a uniform member, or each may be formed from a plurality of independent members.

The shape of the support member is exemplified by a sheet shape, a roller shape, a drum shape, a belt shape, and an endless web shape. When a drum-shaped support member or a belt-shaped endless-web type support member is used, the same intermediate transfer member can be continuously, repeatedly used, and thus such a structure is particularly preferred in terms of productivity. The size of the intermediate transfer member can be freely selected in accordance with an intended print image size. The support member of the intermediate transfer member is required to have a certain structural strength from the viewpoint of the transfer accuracy and the durability thereof. The material of the support member is preferably metals, ceramics, and resins, for example. Specifically, the following materials can be suitably used in terms of the rigidity capable of withstanding the pressure at the time of transfer, dimensional accuracy, and characteristics required to reduce the inertia during operation to improve the control responsivity: aluminum, iron, stainless steel, acetal resins, epoxy resins, polyimide, polyethylene, polyethylene terephthalate, nylon, polyurethane, silica ceramics, and alumina ceramics. It is also preferred to use these materials in combination. When the apparatus shown in FIG. 1 is used, it is preferred to select for the support member 101 one with which the above-mentioned temperature history of an intermediate image can be obtained.

The surface layer member of the intermediate transfer member preferably has a certain elasticity in order to press and bond an intermediate image to a recording medium such as paper and to transfer the intermediate image to the recording medium. When paper is used as the recording medium, the hardness of the surface layer member of the intermediate transfer member is preferably a durometer A hardness of 10° or more and 100° or less and more preferably 20° or more and 60° or less (in accordance with JIS K6253). As the material of the surface layer member, various materials such as polymers, ceramics, and metals can be appropriately used, and various rubber materials and elastomer materials can be preferably used in terms of properties and process characteristics. The material of the surface layer member is exemplified by the following materials: polybutadiene rubbers, nitrile rubbers, chloroprene rubbers, silicone rubbers, fluororubbers, urethane rubbers, styrene elastomers, olefin elastomers, polyvinyl chloride elastomers, ester elastomers, and amide elastomers. In addition, polyether, polyester, polystyrene, polycarbonate, siloxane compounds, and perfluorocarbon compounds can also be suitably used, for example. Specifically, nitrile-butadiene rubber, silicone rubber, fluororubber, and urethane rubber are particularly preferably used in terms of dimensional stability, durability, heat resistance, and the like.

As the surface layer member, a member prepared by laminating a plurality of materials is also preferred. For example, a member prepared by coating an endless belt-shaped urethane rubber with a silicone rubber, a sheet prepared by laminating a silicone rubber on a PET film, and a laminated material prepared by forming a polysiloxane compound film on a urethane rubber sheet can be suitably used. A sheet prepared by infiltrating a rubber material such as nitrile-butadiene rubber and urethane rubber into a cotton fabric or a woven fabric such as polyester fabric and rayon fabric as a base fabric can also be suitably used. The surface layer member may be subjected to an appropriate surface treatment. Examples of the treatment include flame treatment, corona treatment, plasma treatment, polishing treatment, roughening treatment, active energy ray (UV, IR, RF, for example) irradiation treatment, ozone treatment, surfactant treatment, and silane coupling treatment. A plurality of these materials can be combined and subjected to such a treatment. Between the surface layer member and the support member, various adhesives, double-sided adhesive tapes, and the like may be interposed in order to fix and hold these members.

Material

The reaction liquid, the first liquid composition, the ink, and the second liquid composition usable in the image recording apparatus and the image recording method of the present invention will next be described.

Reaction Liquid

The reaction liquid contains a viscosity increasing component for the first liquid composition and a viscosity increasing component for the ink as reactive components. Here, the term "viscosity increasing component" means a component that increases the viscosity of a first liquid composition or an ink. The term "viscosity increasing" of an ink represents the case in which a coloring material, a resin, or the like as a component of the ink is chemically reacted or physically adsorbed on contact with the viscosity increasing component for the ink, and accordingly a viscosity increase of the whole ink is observed. Other than the above case, the term "viscosity increasing" of an ink also includes the case in which a component of the ink, such as a coloring material, is aggregated to locally cause a viscosity increase. The viscosity increasing component for the ink has the effect of lowering the flowability of an ink and/or some components of an ink on an intermediate transfer member and of suppressing bleeding or beading at the time of image formation. The concentration of the viscosity increasing component for the ink in the reaction liquid may be adjusted in accordance with the type of the ink-viscosity increasing component for the ink, application conditions to an intermediate transfer member, and the type of an ink, for example. In the present embodiment, conventionally-known materials such as polyvalent metal ions, organic acids, cation polymers, and porous microparticles can be used as the viscosity increasing component for the ink without any limitation. Specifically preferred are polyvalent metal ions and organic acids. Plural types of viscosity increasing components for the ink are also preferably contained.

The content of the viscosity increasing component for the first liquid composition and the viscosity increasing component for the ink in the reaction liquid is preferably 5% by mass or more relative to the total mass of the reaction liquid.

The metal ion usable as the viscosity increasing component for the ink is specifically exemplified by divalent metal ions and trivalent metal ions. Examples of the divalent metal ion include $Ca^{2+}$, $Cu^{2+}$, $Ni^{2+}$, $Mg^{2+}$, $Sr^{2+}$, $Ba^{2+}$, and $Zn^{2+}$; and examples of the trivalent metal ion include $Fe^{3+}$, $Cr^{3+}$, $Y^{3+}$, and $Al^{3+}$. The organic acid usable as the viscosity increasing component for the ink is specifically exemplified by the following acids: oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, oxysuccinic acid, and dioxysuccinic acid.

The reaction liquid may contain an appropriate amount of water and organic solvents. The water used in this case is preferably a deionized water prepared by ion exchange, for example. The organic solvent usable in the reaction liquid is not limited to particular solvents, and any known organic solvent can be used. Into the reaction liquid, various resins can be added. The addition of an appropriate resin enables an improvement in the adhesion of an intermediate image to a recording medium at the time of transfer or an increase in the mechanical strength of a final image, and thus is preferred. The material to be used may be any material that can coexist with the viscosity increasing component for the ink. Into the reaction liquid, a surfactant or a viscosity modifier can be added to appropriately adjust the surface tension or the viscosity of the reaction liquid, and such a reaction liquid can be used. The material used as the surfactant or the viscosity modifier may be any material that can coexist with the viscosity increasing component for the ink. The surfactant specifically used is exemplified by "Acetylenol E 100" (trade name, manufactured by Kawaken Fine Chemicals Co.).

First Liquid Composition

The first liquid composition containing a first water-soluble resin is used in order to suppress bronzing. The bronzing is a coloring phenomenon of regular reflection light and is caused when the coloring material contained in an ink is exposed to the surface. By the transfer type image recording method, the intermediate image formed on an intermediate transfer member is vertically inverted at the time of transfer and is printed on a recording medium. Thus, when a first liquid composition, an ink, and a second liquid composition are stacked in this order on an intermediate transfer member, the first liquid composition comes to the outermost face of the image on a recording medium as the product. The first liquid composition coming to the outermost face prevents the exposure of an ink coloring material to the surface and suppresses the bronzing.

The first liquid composition is a liquid composition containing at least a first water-soluble resin. The first water-soluble resin is exemplified by similar resins to those exemplified as the second water-soluble resin described later. The first liquid composition is preferably a colorless, transparent liquid. The applicable colorless, transparent liquid is a liquid substantially not containing a coloring agent having a color that is identified by the naked eye.

The first liquid composition can appropriately contain each component in the ink except coloring materials. The polymer compound contained in the first liquid composition may be resin particles having a volume average particle diameter of about 30 to 100 nm. The first liquid composition can be composed of a polymer compound including resin particles, a surfactant, water, and an organic solvent, for example. As for the content of each component in the first liquid composition, the content of the polymer compound including resin particles is preferably 1% by mass or more and 10% by mass or less; the content of the surfactant is preferably 0.01% by mass or more and 5% by mass or less; the content of the water is preferably 30% by mass or more and 90% by mass or less; and the content of the organic solvent is preferably 3% by mass or more and 50% by mass or less. The polymer compound including resin particles, the surfactant, the water, and the organic solvent will be specifically described in the ink section described later.

As the type or the formulation of materials contained in the first liquid composition are changed, the first liquid composition has various glossinesses. More specifically, the glossiness varies with a difference in the refractive index of a material or with a difference in the deformation degree at the time of fixing due to the difference in the particle diameter or the glass transition temperature of resin particles. It is thus preferred to select materials in accordance with an intended glossiness. If resin particles that are contained in the first liquid composition have a glass transition temperature higher than the temperature Tc of the intermediate image coming in contact with a recording medium at the time of transfer, the resin particles are supposed to be unlikely to contribute to the adhesion force between an intermediate transfer member and an intermediate image and not to prevent the transfer.

Ink

Each component usable in the ink will next be described.

(a) Coloring Material

The ink can contain at least one of a pigment and a dye as the coloring material. The dye and the pigment are not limited to particular materials, can be selected from the materials usable as the coloring material for inks, and can be used in a required amount. For example, dyes, carbon black, and organic pigments known as the inks for ink jetting can be used. A coloring material prepared by dissolving and/or dispersing a dye and/or a pigment in a liquid medium can be used. Specifically, various pigments, which have the characteristics of durability and quality of printed materials, are preferred.

(b) Pigment

The pigment in the ink is not limited to particular pigments, and known inorganic pigments and organic pigment can be used. Specifically, pigments represented by color index (C.I.) numbers can be used. As the black pigment, carbon black is preferably used. The content of the pigment in the ink is preferably 0.5% by mass or more and 15.0% by mass or less and more preferably 1.0% by mass or more and 10.0% by mass or less relative to the total mass of the ink.

(c) Pigment Dispersant

The pigment dispersant for dispersing a pigment may be any dispersant that has been used in known ink jet techniques. Specifically, a water-soluble pigment dispersant having both a hydrophilic moiety and a hydrophobic moiety in the molecular structure is preferably used. In particular, a pigment dispersant composed of a resin prepared by copolymerizing a hydrophilic monomer and a hydrophobic monomer is preferably used. Each monomer used here is not limited to particular monomers, and known monomers can be preferably used. Specifically, examples of the hydrophobic monomer include styrene, styrene derivatives, alkyl (meth)acrylates, and benzyl (meth)acrylate. Examples of the hydrophilic monomer include acrylic acid, methacrylic acid, and maleic acid.

The pigment dispersant preferably has an acid value of 50 mg KOH/g or more and 550 mg KOH/g or less. The pigment dispersant preferably has a weight average molecular weight of 1,000 or more and 50,000 or less. The mass ratio of the pigment to the pigment dispersant is preferably in a range from 1:0.1 to 1:3. What is called a self-dispersible pigment, which is dispersible in ink due to surface modification of a pigment itself without the use of the pigment dispersant, is also preferably used.

(d) Resin Particles

The ink can contain various polymer compounds having no coloring material. Of them, resin particles may have the effect of improving image quality or fixability and thus are preferred. The material of the resin particles is not limited to particular materials, and known resins can be appropriately used. Specifically, the following resins are exemplified: homopolymers such as polyolefin, polystyrene, polyurethane, polyester, polyether, polyurea, polyamide, polyvinyl alcohol, poly(meth)acrylic acid and salts thereof, polyalkyl (meth)acrylates, and polydienes; and copolymers prepared by copolymerizing a plurality of monomers of them in combination. The resin constituting the resin particles preferably has a weight average molecular weight of 1,000 or more and 2,000,000 or less. The content of the resin particles in the ink is preferably 1% by mass or more and 50% by mass or less and more preferably 2% by mass or more and 40% by mass or less relative to the total mass of the ink.

In the present embodiment, it is preferred that the resin particles be dispersed in a solvent and the resulting resin particle dispersion be added into the ink. The technique of dispersing resin particles is not limited to particular techniques. Preferred is what is called a self-dispersion type resin particle dispersion in which a resin prepared by homopolymerization of a monomer having a dissociable group or by copolymerization of a plurality of such monomers is dispersed. The dissociable group can be exemplified by a carboxyl group, a sulfonic acid group, and a phosphoric acid group, and the monomer having such a dissociable group is exemplified by acrylic acid and methacrylic acid.

In addition, what is called an emulsion-dispersion type resin particle dispersion in which resin particles are dispersed with an emulsifier can be similarly, suitably used in the present embodiment. As the emulsifier as used herein, any known surfactant having a low molecular weight or a high molecular weight can be suitably used. The surfactant is preferably a nonionic surfactant or a surfactant having the same charge polarity as that of resin particles. The resin particle dispersion preferably has a dispersion particle diameter of 10 nm or more and 1,000 nm or less and more preferably 100 nm or more and 500 nm or less. When the resin particle dispersion used in the embodiment is prepared, various additives are preferably added in order to stabilize the dispersion state. The additives are preferably n-hexadecane, dodecyl methacrylate, stearyl methacrylate, chlorobenzene, dodecyl mercaptan, olive oil, a blue dye (Blue 70), and polymethyl methacrylate, for example.

(e) Surfactant

The ink may contain a surfactant. The surfactant is specifically exemplified by "Acetylenol EH" (trade name, manufactured by Kawaken Fine Chemicals Co.). The content of the surfactant in the ink is preferably 0.01% by mass or more and 5.0% by mass or less relative to the total mass of the ink.

(f) Water and Water-Soluble Organic Solvent

The ink can contain water and/or a water-soluble organic solvent as the solvent. The water is preferably a deionized water prepared by ion exchange, for example. The content of the water in the ink is preferably 30% by mass or more and 97% by mass or less relative to the total mass of the ink. The type of the water-soluble organic solvent is not limited to particular types, and any known organic solvent can be used. The water-soluble organic solvent is specifically exemplified by glycerol, diethylene glycol, polyethylene glycol, and 2-pyrrolidone. The content of the water-soluble organic solvent in the ink is preferably 3% by mass or more and 70% by mass or less relative to the total mass of the ink.

(g) Other Additives

The ink may contain various additives such as pH adjusters, anticorrosives, antiseptic agents, antifungal agents, antioxidants, reduction inhibitors, water-soluble resins and neutralizers thereof, and viscosity modifiers, in addition to the above components as necessary.

Second Liquid Composition

Onto the intermediate transfer member, a second liquid composition containing a second water-soluble resin which functions as a binder in images is applied. This can improve the adhesion of an intermediate image to a recording medium and improve the abrasion resistance (fixability) of a final image after the transfer of the intermediate image to the recording medium. The second liquid composition may be an aqueous composition or a non-aqueous composition, but contains a second water-soluble resin.

The second water-soluble resin may be any type that can give an intended binder function in images, but the type of the water-soluble resin is preferably changed in accordance with the type of the second liquid composition applying unit. For example, when the second liquid composition applying unit is an ink jet device, the resin preferably has a weight average molecular weight of 2,000 or more and 10,000 or less and more preferably 5,000 or more and 10,000 or less. When the second liquid composition applying unit is a coating unit such as roller coating, a water-soluble resin having a much larger weight average molecular weight can be used. The water-soluble resin preferably has a glass transition temperature Tgs of 40° C. or more and 120° C. or less.

Such a water-soluble resin is specifically exemplified by the following resins: block copolymers, random copolymers, and graft copolymers of at least two or more monomers (at least one of them is a hydrophilic polymerizable monomer) selected from styrene (homopolymer Tg=100° C.), styrene derivatives, vinylnaphthalene (homopolymer Tg=159° C.), vinylnaphthalene derivatives, aliphatic alcohol esters of $\alpha,\beta$-ethylenically unsaturated carboxylic acids, acrylic acid, acrylic acid derivatives, maleic acid, maleic acid derivatives, itaconic acid, itaconic acid derivatives, fumaric acid, fumaric acid derivatives, vinyl acetate, vinyl alcohol, vinylpyrrolidone, acrylamide, and derivatives thereof; and salts of these copolymers. Natural resins such as rosin, shellac, and starch can also be preferably used. These water-soluble resins are alkali-soluble resins which are soluble in an aqueous solution in which a base is dissolved.

In the second liquid composition, the content of such a water-soluble resin is preferably 0.1% by mass or more and 20% by mass or less and more preferably 0.1% by mass or more and 10% by mass or less relative to the total mass of the second liquid composition. The second liquid composition preferably has a surface tension lower than the surface tension of an ink. This enables the second liquid composition to spread on an intermediate transfer member, and the accessibility to an ink can be improved. The second liquid composition preferably contains resin particles. In this case, the second liquid composition can contain resin particles similar to the resin particles contained in the ink. This can prevent the ink applied to an intermediate transfer member from moving on the transfer member or can improve toughness of the image on a recording medium.

The image recording apparatus of the second embodiment has the constitution in which the second water-soluble resin is contained in the ink to cause the ink to have the effect equivalent to that of the second liquid composition. In this case, the reaction liquid, the first liquid composition, and the ink are used to form an intermediate image, and the application of the second liquid composition is not needed. Thus, the liquid content in the intermediate image can be reduced. In the ink, the content of such a second water-soluble resin is preferably 0.1% by mass or more and 20% by mass or less and more preferably 0.1% by mass or more and 10% by mass or less relative to the total mass of the ink.

2. Image Recording Method

First Embodiment

In an image recording method of the present embodiment, a reaction liquid is applied onto an intermediate transfer member, and then a first liquid composition that contains a first water-soluble resin and causes viscosity increase on contact with the reaction liquid is applied to the intermediate transfer member so as to at least partly overlap with an area where the reaction liquid is applied. Next, an ink is applied to the intermediate transfer member so as to at least partly overlap with an area where the first liquid composition is applied. Subsequently, a second liquid composition that contains a second water-soluble resin is applied to the intermediate transfer member so as to at least partly overlap with an area where the ink is applied to form an intermediate image. Then, the intermediate image is transferred to a recording medium in such a condition that the temperature T1 of the intermediate transfer member is adjusted to a temperature not less than the glass transition temperature Tgs of the water-soluble resin and the temperature T2 of the recording medium is adjusted to a temperature less than the glass transition temperature Tgs of the water-soluble resin.

In the image recording method of this embodiment, the temperature Tc of the intermediate image and the temperature T1 of the intermediate transfer member from a position at which the intermediate image starts to be in contact with the recording medium to a position at which the intermediate image is separated from the intermediate transfer member are adjusted to a temperature not less than the glass transition temperature Tgs of the water-soluble resin in the intermediate image. This increases the flowability of the intermediate image and reduces the adhesion between the intermediate transfer member and the intermediate image when the intermediate image comes in contact with the recording medium, and thus the intermediate image is likely to be separated from the intermediate transfer member. In addition, the temperature Tr of the intermediate image and the temperature T2 of the recording medium at a position at which the intermediate image is separated from the intermediate transfer member are adjusted to a temperature less than the glass transition temperature Tgs of the water-soluble resin in the intermediate image. This rapidly decreases the temperature of the intermediate image after the contact with the recording medium, and the water-soluble resin becomes in a glassy state. Accordingly, the adhesion between the final image and the recording medium is increased, and the interfacial separation is unlikely to be caused. As a result, the efficiency of transferring the intermediate image to the recording medium is improved, and an excellent image can be obtained.

When the temperature of an intermediate transfer member is the temperature T1, a certain period of time is required from the instant when heat conduction from the intermediate transfer member to an intermediate image takes place until the instant when the temperature Tc of the intermediate image becomes the temperature T1. The present embodiment, however, enables the adjustment of the temperature Tc of the intermediate image to the temperature T1 at the start of transfer (at the start of the contact with the recording medium) by heating the intermediate transfer member before the transfer, for example. In addition, the intermediate image is a very thin film-like image, and thus when the intermediate image comes in contact with a recording medium at the start of transfer, the heat conduction from the intermediate image to the recording medium occurs for a very short period of time. Meanwhile, the recording medium typically has a much larger thickness than that of the intermediate image, and the temperature of the recording medium is not increased. Thus, at the completion of transfer (at the time of separation from the intermediate transfer member), the temperature Tr of the intermediate image is supposed to be less than Tgs of the water-soluble resin. As described above, the intermediate image has a very small thickness, and thus the heat conduction rate in the intermediate image does not control the change in temperature of the intermediate image in the present embodiment. Hence, it is not necessary to consider such conditions at the time of transfer that the heat conduction from the intermediate transfer member to the intermediate image and the heat conduction from the intermediate image to the recording medium require a certain period of time to cause a temperature gradient in the intermediate image.

Each of the temperature T1 of the intermediate transfer member and the temperature T2 of the recording medium can be determined by measuring the temperatures on the surface of the intermediate transfer member and the surface of the recording medium with an infrared thermometer immediately before and immediately after the pressing with a pressure roller. These temperatures are achieved by the following procedure. The change in temperature on the surface of the intermediate transfer member during the conveyance time from a heating position with the heater 109 to a pressuring position with the pressure roller 110 in the apparatus in FIG. 1 is estimated. Then, the change in temperature on each surface of the intermediate transfer member and the recording medium is measured when the surface of the intermediate transfer member is pressed with the pressure roller through the recording medium. The structures and the operation conditions of the apparatus shown in FIG. 1 are selected in such a manner that the temperature history based on these temperature changes achieves an intended temperature T1 of the intermediate transfer member and an intended temperature T2 of the recording medium. This enables the temperature adjustment of an intended temperature T1 and an intended temperature T2. The temperature T1 may be any temperature that is higher than the temperature T2 and is not lower than the glass transition temperature Tgs of the water-soluble resin, but the difference between the temperature T1 and the temperature T2, "T1−T2", is preferably 10° C. or more and 35° C. or less.

The temperature Tc and the temperature Tr of the intermediate image can also be determined by measuring the temperature on the surface of the intermediate image with an infrared thermometer before and after the pressing with the pressure roller. The change in temperature can also be estimated in advance by simulation, for example. The simulation can be performed by using a general purpose thermofluid analysis software such as FLOW 3D by Flow Science Japan Co, ANSYS Fluent by ANSYS Japan Co., and star-ccm+ by CD-adapco Co. and so on. For the simulation, the thermophysical properties and the contact resistance of each material are preferably, actually measured and applied. The contact resistance varies with paper types, pressures, and the surface roughness of a transfer member and is about 0.0001 to 0.0007 $m^2 \cdot k/W$.

The temperature Tc and the temperature Tr of the intermediate image can also be achieved by appropriately selecting the structures and the operation conditions of the apparatus shown in FIG. 1. The glass transition temperature Tgs of the water-soluble resin is determined with a differential scanning calorimeter (DSC 822e, manufactured by METTLER TOLEDO Co.). The glass transition temperature can be determined as follows: 10 mg of a water-soluble resin is placed in an aluminum crucible; and a temperature cycle from 30° C. to 120° C. (a temperature increase rate of 2° C./min) is performed twice in a nitrogen gas atmosphere (20 ml/min).

Second Embodiment

An image recording method of the second embodiment differs from the image recording method of the first embodiment in that an ink containing a second water-soluble resin is used as the ink in the ink applying step and that the second liquid composition applying step is not included. In other words, by the image recording method of the second embodiment, the intermediate image is formed by the reaction liquid, the first liquid composition, and the ink on the intermediate transfer member. The embodiment can simplify the process.

Each step of the two embodiments of the image recording method will next be described in detail. The components constituting the reaction liquid, the first liquid composition, the ink, and the second liquid composition can be the same as those described in the section of the image recording apparatus.

Reaction Liquid Applying Step

As the method of applying the reaction liquid to the surface of the intermediate transfer member, various known techniques can be appropriately used. Examples of the technique include die coating, blade coating, techniques using gravure rollers, techniques using offset rollers, and spray coating. The method of using an ink jet device to apply the reaction liquid is also preferred. A combination of a plurality of the above methods is also preferred.

First Liquid Composition Applying Step

Subsequently, to the surface of the intermediate transfer member to which the reaction liquid is applied, a first liquid composition is applied so as to at least partly overlap with an area where the reaction liquid is applied. This step allows the first liquid composition to come in contact with the reaction liquid containing the viscosity increasing component for the first liquid composition and causes viscosity increase. The application method is not limited to particular methods, and an ink jet device is preferably used to apply the first liquid composition. The ink jet device applied to the embodiment is exemplified by the following devices (1) to (3).

(1) A device that includes an electrothermal converter for causing film boiling of the first liquid composition to form bubbles and ejects the first liquid composition.

(2) A device that ejects the first liquid composition by an electromechanical converter.

(3) A device that ejects the first liquid composition by using static electricity.

In addition to the above devices, any of various ink jet devices applicable to the ink jet liquid ejection technique can also be used. Of them, the device using an electrothermal converter can be suitably used from the viewpoint of particularly high-density printing at high speed.

The whole shape of the ink jet device is not limited to particular shapes. For example, what is called a shuttle type ink jet head in which scanning of a head is conducted in a direction orthogonal to the moving direction of the intermediate transfer member for recording can be used. In addition, what is called a line-head type ink jet head in which ink ejection orifices are arranged in a linear manner substantially orthogonal to the moving direction of the intermediate transfer member (i.e., substantially parallel with the axis direction for a drum-shaped intermediate transfer member) can also be used. The first liquid composition may have any properties as long as the effect of the invention is not impaired, and preferably has a surface tension of 20 mN/m or more and 50 mN/m or less.

Ink Applying Step

Subsequently, to the surface of the intermediate transfer member to which the reaction liquid and the first liquid composition are applied, an ink is applied so as to at least partly overlap with an area where the first liquid composition is applied. When the reaction liquid contains the viscosity increasing component for the ink, the ink comes in contact with the reaction liquid to cause viscosity increase. The method of applying the ink is not limited to particular methods, and an ink jet device is preferably used to apply the ink as with the case of the first liquid composition. The ink may have any properties as long as the effect of the invention is not impaired, and preferably has a surface tension of 20 mN/m or more and 50 mN/m or less.

In the first embodiment, the following second liquid composition applying step is subsequently performed, but in the second embodiment, an intermediate image is formed on the intermediate transfer member with the reaction liquid, the first liquid composition, and the ink through the ink applying step.

Second Liquid Composition Applying Step

Next, to the surface of the intermediate transfer member to which the reaction liquid, the first liquid composition, and the ink are applied, a second liquid composition containing a second water-soluble resin is applied so as to at least partly overlap with an area where the ink is applied. The method of applying the second liquid composition is not limited to particular methods, and an ink jet device is preferably used as with the application of the ink. Through this step, an intermediate image is formed on the intermediate transfer member with the reaction liquid, the first liquid composition, the ink, and the second liquid composition. The second liquid composition may have any properties as long as the effect of the invention is not impaired, and preferably has a surface tension of 20 mN/m or more and 50 mN/m or less.

In the first embodiment, the first liquid composition contains the first water-soluble resin, but the amount w1 of the water-soluble resin is preferably 2% by mass or more less than the amount w2 of the second water-soluble resin contained in the second liquid composition. This case has such an advantage that the adhesion between the intermediate image and the recording medium is greater than the adhesion between the intermediate image and the intermediate transfer member to promote the transfer.

Also in the second embodiment, the first liquid composition contains the first water-soluble resin, but the amount w1 of the water-soluble resin is preferably 2% by mass or more less than the amount w1 of the second water-soluble resin contained in the ink. This case has such an advantage that the adhesion between the intermediate image and the recording medium is greater than the adhesion between the intermediate image and the intermediate transfer member to promote the transfer.

In the first embodiment and the second embodiment, at least one or more of or all of the first liquid composition, the ink, and the second liquid composition preferably contain resin particles. This case has such an advantage that the intermediate image is prevented from shrinking.

In the first embodiment and the second embodiment, the water-soluble resin preferably has a weight average molecular weight of 5,000 or more and 10,000 or less. This case has such an advantage that an ink jet ejection apparatus can perform stable ejection.

The temperature T1 of the intermediate transfer member is preferably a temperature less than the glass transition temperature Tgp of the resin particles contained in the first liquid composition. This case has such an advantage that the adhesion between the intermediate image and the intermediate transfer member is reduced to improve the separation from the intermediate transfer member.

Liquid Content Removal Step

In the present embodiment, a step of reducing a liquid content from the intermediate image formed on the intermediate transfer member is preferably provided. In the liquid content removal step, an excess liquid content in the intermediate image is removed. Accordingly, the liquid content is prevented from overflowing in the transfer step, and a good final image can be obtained. As the removal technique of the liquid content, any of various techniques commonly used can be suitably used. For example, any of a heating method, a method of supplying low-humidity air, a decompression method, a method of bringing an absorber into contact, and a combination method of them can be suitably used. The liquid content can also be removed by air drying. When the liquid content is removed by heating, the intermediate transfer member is heated by the heating, and consequently the temperature of the intermediate transfer member may become not less than the glass transition temperature Tgs of the water-soluble resin. In this case, the heating unit for removing the liquid content also functions as the temperature adjusting unit.

Intermediate Image Transfer Step

In the transfer step, the intermediate image is transferred from the intermediate transfer member onto a recording medium on such a condition that the temperature T1 of the intermediate transfer member is adjusted to a temperature not less than the glass transition temperature Tgs of the water-soluble resin and the temperature T2 of the recording medium is adjusted to a temperature less than the glass transition temperature Tgs of the water-soluble resin. The method of transferring the intermediate image is not limited to particular methods. For example, by pressing the intermediate transfer member against the recording medium, the intermediate image on the intermediate transfer member is transferred to the recording medium. The technique of pressing the intermediate transfer member against the recording medium is not limited to particular techniques. It is preferred that a pressure roller be placed to face the outer peripheral surface of the intermediate transfer member and the recording medium be allowed to pass between the intermediate transfer member and the pressure roller. When the intermediate image is pressed from both sides of the intermediate transfer member and the recording medium in this manner, the intermediate image is efficiently transferred. The pressing through multiple steps as shown in FIG. 3 is also preferred due to the effect of suppressing defective transfer in the transfer step. In such a case, such a multistage arrangement that the temperature of the intermediate image at a position at which the intermediate image is separated from the intermediate transfer member is Tr in the final step is employed.

For the temperature control of the recording medium at the time of transfer, a heater may be provided in the pressure roller. The heater may be provided so as to heat a part of or all of the pressure roller. As described above, the temperature T1 of the intermediate transfer member is not less than the temperature Tgs, and the temperature T2 of the recording medium is less than the temperature Tgs at the time of transfer. To satisfy these conditions, the temperature of the pressure roller is preferably varied within the temperature T2 of the recording medium depending on the type of the water-soluble resin to be used, and the heater is preferably capable of heating the surface of the pressure roller from 25° C. to 140° C. The conveyance speed of the recording medium at the time of transfer is preferably 0.1 m/s or more and 3 m/s or less, and the nip pressure between the pressure roller and the intermediate transfer member is preferably 5 $kg/cm^2$ or more and 30 $kg/cm^2$ or less.

Fixing Step

As an additional step, the recording medium on which an image has been recorded after transfer may be pressed with a roller to improve the fixability of the final image to the recording medium. It is also preferred to heat the recording medium because the fixability of the final image may be improved. A heat roller may be used to simultaneously perform pressing and heating.

EXAMPLES

Examples of the present invention will next be described with reference to drawings. The present invention is not intended to be limited to the following examples without departing from the scope of the invention. In the following description, "part" and "%" are based on mass unless otherwise noted.

Example 1

1. Image Recording Apparatus

The image recording apparatus in FIG. 1 was used. As the support member 101 of the intermediate transfer member, a cylindrical-shaped drum made of aluminum alloy (an outer diameter of 1,000 mm, a length of 350 mm) was used in consideration of required properties such as the rigidity capable of withstanding the pressing at the time of transfer, dimensional accuracy, and improved control responsivity by reducing the rotation inertia, for example. As the material of the surface layer member 102 of the intermediate transfer member, a material prepared by coating a PET sheet having a thickness of 0.5 mm with a silicone rubber having a rubber hardness of 40° and a thickness of 0.2 mm (KE12 manufactured by Shin-Etsu Chemical Co., Ltd.) was used. The surface was subjected to plasma surface treatment with an atmospheric pressure plasma treatment apparatus (ST-7000 manufactured by Keyence Corporation) under conditions of a treatment distance of 5 mm, a plasma mode of "High", and a treatment speed of 100 mm/sec. The surface was further subjected to surfactant treatment by 10-second immersion in an aqueous surfactant solution that was prepared by diluting a commercially available neutral detergent (trade name: Yashinomi Detergent) containing sodium alkylbenzene sulfonate with ion-exchanged water so as to give a concentration of 3%. The surface was then dried to give the surface layer member 102. The surface layer member 102 prepared in this manner was fixed onto the support member 101 with a double-sided pressure-sensitive adhesive tape, yielding an intermediate transfer member.

As the reaction liquid applying unit, a roller type coating apparatus 105 equipped with a roller having an outer diameter of 100 mm and a length of 350 mm was used. As the first liquid composition applying unit, an ink jet device 106 was used; as the ink applying unit for applying inks, ink jet devices 107 were used; and as the second liquid composition applying unit, an ink jet device 108 was used. As the recording medium, OK-Prince high quality paper (manufactured by Oji Paper Co., Ltd., 127.9 $g/m^2$) was used.

2. Preparation of Materials

The reaction liquid, the first liquid composition, the ink, and the second liquid composition were prepared by the following procedure.

Preparation of Reaction Liquid

First, 30 parts of glutaric acid, 7 parts of glycerol, 5 parts of a surfactant (trade name "Acetylenol E 100", manufactured by Kawaken Fine Chemicals Co., hereinafter referred to as surfactant A), and 58 parts of ion-exchanged water were mixed and thoroughly stirred, and then the mixture was subjected to pressure filtration through a microfilter with a pore size of 3.0 μm (manufactured by Fujifilm Corporation), giving a reaction liquid.

Preparation of Pigment Dispersion Liquid

First, 10 parts of a cyan pigment (C.I. Pigment Blue 15:3), 15 parts of an aqueous solution of a pigment dispersant (a styrene-ethyl acrylate-acrylic acid copolymer having a weight average molecular weight of 8,000; a solid content of 20%; neutralized with potassium hydroxide), and 75 parts of ion-exchanged water were mixed. The mixture was placed in a batch type vertical sand mill (manufactured by Aimex Co.), and 200 parts of 0.3-mm zirconia beads were placed. The mixture was dispersed for 5 hours while being cooled with water. The dispersion liquid was subjected to a centrifuge separator to remove coarse particles having particle diameters of 200 to 300 nm or more, giving a pigment dispersion liquid having a pigment concentration of about 10%.

Preparation of Resin Particle Dispersion 1

First, 18 parts of butyl methacrylate, 2 parts of 2,2'-azobis-(2-methylbutyronitrile), and 2 parts of n-hexadecane were mixed and stirred for 0.5 hour, giving a mixture. The mixture was added dropwise to 78 parts of a 6% aqueous solution of "NIKKOL BC15" (trade name, manufactured by Nikko Chemicals Co.) as an emulsifier, and the resulting mixture was stirred for 0.5 hour. Next, the mixture was sonicated with a sonicator (frequency: 30 kHz, output power: 300 W) for 3 hours. Subsequently, the mixture was polymerized under a nitrogen atmosphere at 80° C. for 4 hours. The reaction mixture was cooled to room temperature and then filtered, giving resin particle dispersion 1 having a solid content concentration of about 20% and containing resin particles having a glass transition temperature of 71° C. (the resin particles had a volume average particle diameter of 120 nm). The glass transition temperature was determined as follows: A differential scanning calorimeter (DSC 822e, manufactured by METTLER TOLEDO Co.) was used; 10 mg of a resin particle dispersion was placed in an aluminum crucible; and a temperature cycle of from 30° C. to 120° C. (a temperature increase rate of 2° C./min) was performed twice in a nitrogen gas atmosphere (20 ml/min).

Preparation of Resin Particle Dispersion 2

Resin particle dispersion 2 containing resin particles having a glass transition temperature of 101° C. (the resin particles had a volume average particle diameter of 120 nm) was obtained by replacing the butyl methacrylate in the preparation method of the resin particle dispersion 1 with methyl methacrylate.

Preparation of First Liquid Composition

First, 50 parts of the resin particle dispersion 1, 2 parts of a water-soluble resin (a styrene-butyl acrylate-acrylic acid copolymer having a weight average molecular weight of 7,700 and a glass transition temperature of 78° C.; a solid content concentration of 20%; neutralized with potassium hydroxide), 5 parts of glycerol, 7 parts of diethylene glycol, 0.5 part of a surfactant (trade name "Acetylenol EH", manufactured by Kawaken Fine Chemicals Co., hereinafter referred to as surfactant B), and 37.5 parts of ion-exchanged water were mixed and thoroughly stirred, and then the mixture was subjected to pressure filtration through a microfilter with a pore size of 3.0 μm (manufactured by Fujifilm Corporation), giving a first liquid composition.

Preparation of Ink

First, 5 parts of the pigment dispersion liquid, 30 parts of the resin particle dispersion 1, 5 parts of glycerol, 4 parts of diethylene glycol, 1 part of the surfactant B, and 55 parts of ion-exchanged water were mixed and thoroughly stirred, giving a mixture. The mixture was then subjected to pressure filtration through a microfilter with a pore size of 3.0 μm (manufactured by Fujifilm Corporation), giving an ink.

Preparation of Second Liquid Composition

First, 30 parts of the resin particle dispersion 1, 5 parts of a water-soluble resin (a styrene-butyl acrylate-acrylic acid copolymer having a weight average molecular weight of 7,700 and a glass transition temperature of 78° C.; a solid content concentration of 20%; neutralized with potassium hydroxide), 5 parts of glycerol, 4 parts of diethylene glycol, 1 part of the surfactant B, and 55 parts of ion-exchanged water were mixed and thoroughly stirred, giving a mixture. The mixture was then subjected to pressure filtration through a microfilter with a pore size of 3.0 μm (manufactured by Fujifilm Corporation), giving a second liquid composition. The glass transition temperature Tgs of the water-soluble resin was determined with a differential scanning calorimeter (manufactured by METTLER TOLEDO Co.).

3. Image Recording

The apparatus in FIG. 1 was used to record images by the following procedure. First, the reaction liquid prepared as above was applied with the roller type coating apparatus 105 onto the intermediate transfer member 103. From the respective ink jet devices 106, 107, and 108, the first liquid composition, the ink, and the second liquid composition prepared as above were then ejected onto the intermediate transfer member. Consequently, an intermediate image was formed. The intermediate image was formed by successively overlapping the reaction liquid at 1 $g/m^2$, the first liquid composition at 10 $g/m^2$, the ink at 16 g/m, and the second liquid composition at 10 $g/m^2$ on the intermediate transfer member. Next, the liquid content was removed from the intermediate image on the intermediate transfer member with the blower 117 (at an air velocity of 3 m/s), and the intermediate transfer member was concurrently heated with the heater 109 provided in the intermediate transfer member. Subsequently, with the rotation of the intermediate transfer member in the arrow direction, the recording medium 111 was brought into contact with the intermediate image between the intermediate transfer member 103 and the pressure roller 110 in the image transfer unit 113, and the intermediate image was transferred from the intermediate transfer member to the recording medium.

At the time of the transfer, the temperature T1 of the intermediate transfer member was 80° C., and the temperature T2 of the recording medium was 25° C. Here, the temperature on the surface of the intermediate transfer member immediately before the pressing with the pressure roller and the temperature on the surface of the recording medium immediately after the pressing were measured with an infrared thermometer to determine the temperature T1 and the temperature T2, respectively. The temperature Tc of the intermediate image was determined by measuring the temperature on the surface of the intermediate transfer member immediately before and immediately after the pressing with the pressure roller. The temperature Tc was 80° C. The temperature Tr of the intermediate image was determined by measuring the temperature on the surface of the recording medium immediately after the pressing with the pressure roller. The temperature Tr was 25° C.

4. Evaluation

The transfer rate and the bronzing of an image on the recording medium obtained by the above image recording were evaluated. The evaluation results are shown in Table 1. In each evaluation item, ranks A and B are preferred levels, and rank C is an unacceptable level.

In Table 1, "content of water-soluble resin in ink" represents a value obtained by excluding the content of the water-soluble resin contained in the pigment dispersion liquid.

Transfer Rate

The area of an intermediate image was determined by the observation under an optical microscope. From the ratio of area S1 of an intermediate image on the intermediate transfer member before transfer to area S2 of an intermediate image left on the intermediate transfer member after transfer, the transfer rate of an intermediate image transferred to the recording medium "100(S1−S2)/S1"% was calculated. The transfer rate was ranked based on the following criteria.

Rank A: the transfer rate is 98% or more (almost all the image is transferred).

Rank B: the transfer rate is not less than 90% and less than 98% (a left image is identified but is difficult to visually observe).

Rank C: the transfer rate is less than 90% (a left image is visually observed).

Bronzing

For bronzing evaluation, regular reflection light was measured with an intensified multichannel spectrophotometer (manufactured by Otsuka Electronics Co., MCPD-7000). Light was applied from a light source to the image on a recording medium at an incidence angle of 45°, and the reflected light was received at 45°. Of the obtained measurement data of the regular reflection light, chroma was used for evaluation.

Rank A: the chroma is less than 1 (no bronzing occurs).

Rank B: the chroma is not less than 1 and less than 10 (bronzing occurs slightly).

Rank C: the chroma is not less than 10 (bronzing occurs and is likely to be visually observed).

Example 2

The image recording and evaluation were performed in the same manner as in Example 1 except that the second liquid composition contained 15 parts of the water-soluble resin (a solid content of 20%) and 45 parts of ion-exchanged water. The evaluation results are shown in Table 1.

Example 3

A recording apparatus having no ink jet device 108 for ejecting the second liquid composition was used; and no second liquid composition was applied. The water-soluble resin in the second liquid composition in Example 1 was used as a component in the ink. Five parts of a black pigment dispersion liquid, 30 parts of the resin particle dispersion 1, 5 parts of glycerol, 4 parts of diethylene glycol, 1 part of the surfactant B, 15 parts of the water-soluble resin (a solid content of 20%), and 40 parts of ion-exchanged water were mixed and thoroughly stirred, giving an ink. The image recording and evaluation were performed in the same manner as in Example 1 except the above conditions. The evaluation results are shown in Table 1.

Example 4

The recording apparatus in FIG. 1 was used; the temperature T1 of the intermediate transfer member was adjusted to 80° C.; and the temperature T2 of the recording medium was adjusted to 75° C. The image recording and evaluation were performed in the same manner as in Example 2 except the above conditions. The evaluation results are shown in Table 1.

Example 5

The recording apparatus in FIG. 1 was used; the temperature T1 of the intermediate transfer member was adjusted to 80° C.; and the temperature T2 of the recording medium was adjusted to 70° C. The image recording and evaluation were performed in the same manner as in Example 2 except the above conditions. The evaluation results are shown in Table 1.

Example 6

The recording apparatus in FIG. 1 was used; the temperature T1 of the intermediate transfer member was adjusted to 110° C.; and the temperature T2 of the recording medium was adjusted to 75° C. The image recording and evaluation were performed in the same manner as in Example 2 except the above conditions. The evaluation results are shown in Table 1.

Example 7

The image recording and evaluation were performed in the same manner as in Example 1 except that the first liquid composition was prepared by using the resin particle dispersion 2. The evaluation results are shown in Table 1.

Example 8

The recording apparatus in FIG. 1 was used; the second liquid composition contained 7 parts of the water-soluble resin (a solid content of 20%) and 53 parts of ion-exchanged water; and the temperature T1 of the intermediate transfer member was adjusted to 110° C. The image recording and evaluation were performed in the same manner as in Example 1 except the above conditions. The evaluation results are shown in Table 1.

Comparative Example 1

A recording apparatus having no ink jet device 108 for ejecting the second liquid composition was used; and no second liquid composition was applied onto the intermediate transfer member. The image recording and evaluation were performed in the same manner as in Example 1 except the above conditions. The evaluation results are shown in Table 1.

Comparative Example 2

The recording apparatus in FIG. 1 was used; the temperature T1 of the intermediate transfer member was adjusted to 50° C. which was less than the glass transition temperature of the water-soluble resin; and the temperature T2 of the recording medium was adjusted to 25° C. The image recording and evaluation were performed in the same manner as in Example 1 except the above conditions. The evaluation results are shown in Table 1.

Comparative Example 3

A recording apparatus having no ink jet device 106 for ejecting the first liquid composition was used; and no first liquid composition was applied onto the intermediate transfer member. The image recording and evaluation were performed in the same manner as in Example 1 except the above conditions. The evaluation results are shown in Table 1.

TABLE 1

|  | Example 1 | Example 2 | Example 3 | Example 4 | Example 5 | Example 6 |
|---|---|---|---|---|---|---|
| Presence or absence of first liquid composition | Presence | Presence | Presence | Presence | Presence | Presence |
| Glass transition temperature of resin particles in first transparent liquid composition (° C.) | 71 | 71 | 71 | 71 | 71 | 71 |
| Temperature of intermediate transfer member $T_1$ (° C.) | 80 | 80 | 80 | 80 | 80 | 110 |
| Glass transition temperature of water-soluble resin Tgs (° C.) | 78 | 78 | 78 | 78 | 78 | 78 |
| Temperature of recording medium $T_2$ (° C.) | 25 | 25 | 25 | 75 | 70 | 75 |
| $T_1 - T_2$ (° C.) | 55 | 55 | 55 | 5 | 10 | 35 |
| Content of water-soluble resin in ink (%) | — | — | 3 | — | — | — |
| Content of water-soluble resin in second liquid composition (%) | 1 | 3 | — | 3 | 3 | 3 |

TABLE 1-continued

| | | | | | | |
|---|---|---|---|---|---|---|
| Presence or absence of resin particles in second liquid composition | Presence | Presence | Absence | Presence | Presence | Presence |
| Evaluation Transferability | B | A | A | B | A | A |
| Bronzing | A | A | A | A | A | A |

| | Example 7 | Example 8 | Comparative Example 1 | Comparative Example 2 | Comparative Example 3 |
|---|---|---|---|---|---|
| Presence or absence of first liquid composition | Presence | Presence | Presence | Presence | Absence |
| Glass transition temperature of resin particles in first transparent liquid composition (° C.) | 101 | 71 | 71 | 71 | — |
| Temperature of intermediate transfer member $T_1$ (° C.) | 80 | 110 | 80 | 50 | 80 |
| Glass transition temperature of water-soluble resin Tgs (° C.) | 78 | 78 | — | 78 | 78 |
| Temperature of recording medium $T_2$ (° C.) | 25 | 25 | 25 | 25 | 25 |
| $T_1 - T_2$ (° C.) | 55 | 85 | 55 | 25 | 55 |
| Content of water-soluble resin in ink (%) | — | — | — | — | — |
| Content of water-soluble resin in second liquid composition (%) | 1 | 2 | 1 | 1 | 1 |
| Presence or absence of resin particles in second liquid composition | Presence | Presence | — | Presence | Presence |
| Evaluation Transferability | A | B | C | C | A |
| Bronzing | A | A | A | A | C |

The results in Table 1 indicate that Examples 1 to 8 using the method of the invention achieved good transfer rates and especially Examples 2 and 3 in which the content of the water-soluble resin was increased showed higher transfer rates. In contrast, Comparative Example 1 showed low transferability because no second liquid composition was applied. Comparative Example 2 showed low transferability because the temperature T1 of the intermediate transfer member was a temperature less than the glass transition temperature Tgs of the water-soluble resin. Comparative Example 3 caused bronzing because no first liquid composition was applied. The above results reveal that the image recording by the method of the invention enables the suppression of bronzing and the achievement of high transferability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-085966, filed Apr. 20, 2015, which is hereby incorporated by reference herein in its entirety.

What is claimed is:

1. An image recording method comprising:
a reaction liquid applying step of applying a reaction liquid to an intermediate transfer member;
a first liquid composition applying step of applying to the intermediate transfer member a first liquid composition that contains a first water-soluble resin and causes viscosity increase on contact with the reaction liquid so as to at least partly overlap with an area where the reaction liquid is applied;
an ink applying step of applying an ink that contains a second water-soluble resin to the intermediate transfer member so as to at least partly overlap with an area where the first liquid composition is applied, to form an intermediate image;
a transfer step of transferring the intermediate image to a recording medium by bringing the intermediate image on the intermediate transfer member into contact with the recording medium to separate the intermediate image from the intermediate transfer member while keeping the contact with the recording medium; and
a control step of controlling at least one of temperatures of the intermediate image, the intermediate transfer member, and the recording medium,
wherein in the control step a temperature Tc of the intermediate image and a temperature T1 of the intermediate transfer member from a position at which the intermediate image starts to be in contact with the recording medium to a position at which the intermediate image is separated from the intermediate transfer member are adjusted to a temperature not less than a glass transition temperature Tgs of the second water-soluble resin, and a temperature Tr of the intermediate image and a temperature T2 of the recording medium at a position at which the intermediate image is separated from the intermediate transfer member are adjusted to a temperature less than the glass transition temperature Tgs of the second water-soluble resin,
wherein the first liquid composition contains first resin particles,
wherein the ink contains second resin particles, and
wherein the temperature T1 is a temperature less than a glass transition temperature Tgp of the first resin particles contained in the first liquid composition.

2. The image recording method according to claim 1, wherein a difference between the temperature T1 and the temperature T2, T1–T2, is 10° C. or more and 35° C. or less.

3. The image recording method according to claim 1, wherein an amount w1 of the first water-soluble resin contained in the first liquid composition is at least 2% by mass less than an amount wi of the second water-soluble resin contained in the ink.

4. The image recording method according to claim 1, wherein the at least one of the first and second water-soluble resins has a weight average molecular weight of 5,000 or more and 10,000 or less.

5. An image recording apparatus comprising:
an intermediate transfer member;
a reaction liquid applying unit of applying a reaction liquid to the intermediate transfer member;
a first liquid composition applying unit of applying to the intermediate transfer member a first liquid composition that contains a first water-soluble resin and causes viscosity increase on contact with the reaction liquid so as to at least partly overlap with an area where the reaction liquid is applied;
an ink applying unit of applying an ink that contains a second water-soluble resin to the intermediate transfer member so as to at least partly overlap with an area where the first liquid composition is applied to form an intermediate image;
a transfer unit of transferring the intermediate image to a recording medium by bringing the intermediate image on the intermediate transfer member into contact with the recording medium to separate the intermediate image from the intermediate transfer member while keeping the contact with the recording medium; and
a temperature adjusting unit of adjusting or maintaining a temperature T1 of the intermediate transfer member to a temperature not less than a glass transition temperature Tgs of the second water-soluble resin from a position at which the intermediate image starts to be in contact with the recording medium to a position at which the intermediate image is separated from the intermediate transfer member and adjusting or maintaining a temperature T2 of the recording medium to a temperature less than the glass transition temperature Tgs of the second water-soluble resin at a position at which the intermediate image is separated from the intermediate transfer member,
wherein the first liquid composition contains first resin particles,
wherein the ink contains second resin particles, and
wherein the temperature T1 is a temperature less than a glass transition temperature Tgp of the first resin particles contained in the first liquid composition.

6. The image recording method according to claim 1, wherein in the control step, the recording medium is cooled to a temperature less than the glass transition temperature Tgs of the second water-soluble resin.

7. The image recording apparatus according to claim 5, wherein the temperature adjusting unit includes a cooler to cool the recording medium to a temperature less than the glass transition temperature Tgs of the second water-soluble resin.

8. The image recording method according to claim 1, wherein the temperature Tc is 50° C. or more and 140° C. or less.

9. The image recording method according to claim 1, wherein the temperature Tr is 25° C. or more and 70° C. or less.

10. The image recording method according to claim 1, wherein the reaction liquid contains at least one selected from the group consisting of polyvalent metal ions and organic acids.

11. The image recording method according to claim 1, wherein the first liquid composition is a colorless and transparent liquid.

12. The image recording method according to claim 1, wherein the first resin particles have a volume average particle diameter of about 30 to 100 nm.

13. The image recording method according to claim 1, wherein the temperature T1 is a temperature higher than a glass transition temperature of the first water-soluble resin.

14. The image recording method according to claim 1, wherein a difference between the temperature Tgp and the temperature T1, Tgp−T1, is 21° C. or more.

* * * * *